June 19, 1951   H. W. BRINK   2,557,073
MICROMETER ANVIL
Filed Sept. 10, 1947
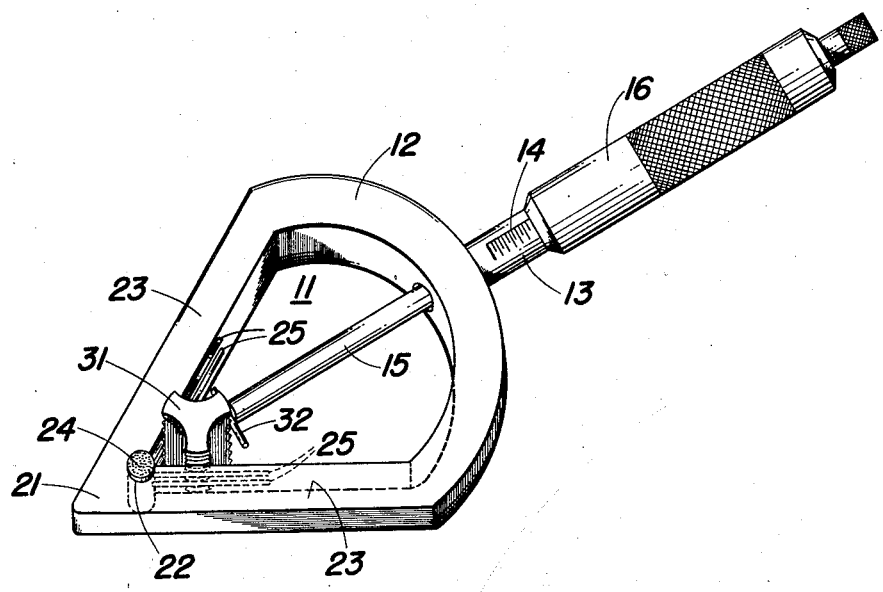
INVENTOR.
Harvey W. Brink
BY
Attorney

Patented June 19, 1951

2,557,073

UNITED STATES PATENT OFFICE 2,557,073

MICROMETER ANVIL

Harvey W. Brink, San Diego, Calif.

Application September 10, 1947, Serial No. 773,286

3 Claims. (Cl. 33—167)

(Granted under the act of March 3, 1883, as amended April 30, 1928; 370 O. G. 757)

This invention relates to a micrometer anvil for use in accurately measuring the diameters of cylindrical objects. More particularly this invention relates to such an anvil used for measuring threaded cylindrical objects.

It is an object of this invention to provide a micrometer for accurately measuring the diameter of a cylindrical object.

It is another object of this invention to provide a micrometer for accurately measuring the effective diameter of a threaded object such as a tap.

It is a further object of this invention to provide a micrometer having means for conveniently and automatically holding in place the gage wires customarily used in measuring the effective diameter of a threaded object.

In accordance with this invention the micrometer body is made generally triangular in shape. The internal apex of one of the body angles forms the micrometer anvil. Threaded transversely through the micrometer frame, which constitutes that leg of the triangular body opposite the anvil, is the micrometer spindle, the axis of which is exactly aligned with the apex of the anvil. In this way, cylindrical objects may be securely embraced by the three points constituted by the two legs of the anvil and the end of the spindle. By proportioning the micrometer scale properly with respect to the pitch of the spindle thread, it is possible to read the diameter of the object directly on the micrometer scale.

In measuring threaded objects, it is customary to employ in the thread grooves gage wires of predetermined thickness. To simplify use of the instant micrometer for threaded objects, the anvil apex is recessed and provided with a piece of sponge rubber into which the gage wires may be embedded. Gage wires thus embedded are directed along each of the two legs of the anvil, so that it is necessary to hold a gage wire only in the third position, between the end of the spindle and the object being measured.

A micrometer anvil constructed in accordance with the principles of the instant invention is illustrated in the accompanying drawing and will now be described with reference thereto, wherein:

The single figure is a perspective view of the micrometer, exemplifying its use for measuring the diameter of a tap.

Referring to the drawing, 11 denotes the micrometer body of generally triangular configuration. The frame 12 of the micrometer is preferably made slightly arcuate, although it may be straight if desired. Secured to the frame 12 and projecting transversely therefrom is a stem 13 on which is marked the micrometer scale 14. Threadedly mounted within the stem 13 and projecting through the frame 12 into the body 11 of the micrometer, is a spindle 15, to the outer end of which is secured the micrometer sleeve 16, in conventional fashion.

The internal angle of the body 11 opposite the triangle leg constituting the frame 12 forms a V-shaped anvil 21. A recess is formed in the apex of the anvil 21 by drilling through the body 11 a small hole 22, the edge of which communicates, over a short arc, with the internal surface of the anvil legs 23.

Pressed into the recess 22 is a small cylinder of sponge rubber 24. Into the rubber 24 may be embedded the ends of gage wires 25, certain of which lie along the inner surface of one of the anvil legs 23, the others lying along the inner surface of the other anvil leg 23.

The tool thus described is effective to measure the diameter of a threaded object such as a tap 31. If the object to be measured is not threaded, it is necessary only to remove the gage wires 25 from the piece of rubber 24, thereby allowing the cylindrical object to rest directly against the anvil legs 23.

In constructing a micrometer in accordance with the instant invention, the stem 13, spindle 15, and scale 14 are made in conventional fashion except that the pitch of the spindle thread is multiplied by a factor of:

$$\tfrac{1}{2}(1+\csc\theta/2)$$

where $\theta$ is the angle between legs 23 of the V-shaped anvil 21. For example, where $\theta$ equals 60°, the normal pitch of the thread of spindle 15 would be increased by factor of 1.5.

Operation

The micrometer of the instant invention is used to measure the diameter of a threaded object in the following manner. Gage wires 25 are embedded in the sponge rubber 24 with some of the wires lying on the inner surface of one of the anvil legs, and some of them lying on the inner surface of the other anvil leg. The lateral spacing of adjacent wires should be a multiple of the thread pitch of the object to be measured, so that the wires will fit snugly into the thread grooves. This is not critical, however, since the pliant nature of the rubber 24 readily permits certain adjustment in use. A tap 31, or other threaded object, is placed in the anvil 21 with the gage wires 25 resting in the grooves of the threads. Another, similar gage wire 32 is then held in place manually in one of the threads of the tap 31, and the spindle 15 is advanced until it abuts the wire 32. The effective diameter of the tap 31 is then read on the scale 14.

Use of the micrometer for non-threaded cylindrical objects is effected by removing the wires 25 and the wire 32, and allowing the object to rest directly on the legs 23.

With conventional micrometers employing flat anvils, there is the danger, when measuring cylindrical objects, of spanning less than a full diameter, thereby obtaining incorrect readings. The instant micrometer precludes such inaccuracy by providing positive, consistent seating of the cylindrical object in the V-shaped anvil 21, the measurement being completed at the third point constituted by the end of the spindle 15.

While this micrometer is especially useful for measuring diameters of cylindrical objects, it will be manifest that the principles thereof are equally applicable to any object having a curved surface capable of being seated in an angular anvil. While the illustrated anvil 21 is in the form of an acute angle, it may, if desired, be made an obtuse angle, for use with objects of slight curvature. The invention may be made and utilized in any suitable shape, size or arrangement, depending upon the configuration of the object to be measured; and various modifications and changes may be made in the invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In a micrometer, a body having a pair of flat sides intersecting at an angle of less than 180 degrees to form an anvil, each of said sides being cut away at their intersection to form a recess in the body communicating with the space between said flat sides; gage members lying against each of said flat sides and extending into said recess; and a member in said recess and protruding into the space between said flat sides adjacent their intersection to hold said gage members against said flat sides.

2. In a micrometer, a body having a pair of flat sides intersecting at an angle of less than 180 degrees to form an anvil, each of said sides being cut away at their intersection to form a generally cylindrical recess in said body communicating with the space between said flat sides; gage members lying against each of said flat sides and extending into said recess; and a pliable retaining member in said recess and protruding into the space between said flat sides adjacent their intersection to hold said gage members against said flat sides.

3. In a micrometer, a body having a pair of flat sides intersecting at an angle of less than 180 degrees to form an anvil, each of said sides being cut away at their intersection to form a generally cylindrical recess in said body having an open portion communicating with the space between said flat sides; and a pliable retaining member in said recess and protruding into the space between said flat sides adjacent their intersection.

HARVEY W. BRINK.

REFERENCES CITED

The following references are of record in the file of this patent:

UNITED STATES PATENTS

| Number | Name | Date |
|---|---|---|
| 1,499,730 | Hanson | July 1, 1924 |
| 1,573,347 | Labasse | Feb. 16, 1926 |

FOREIGN PATENTS

| Number | Country | Date |
|---|---|---|
| 36,936 | France | May 20, 1930 |
|  | (Addition to No. 667,185) | |
| 392,091 | Germany | Mar. 15, 1924 |
| 397,631 | Great Britain | Aug. 31, 1933 |